Sept. 28, 1926.
G. BORNEMANN ET AL
1,601,288
STALK CUTTING APPARATUS
Filed April 28, 1924   2 Sheets-Sheet 2
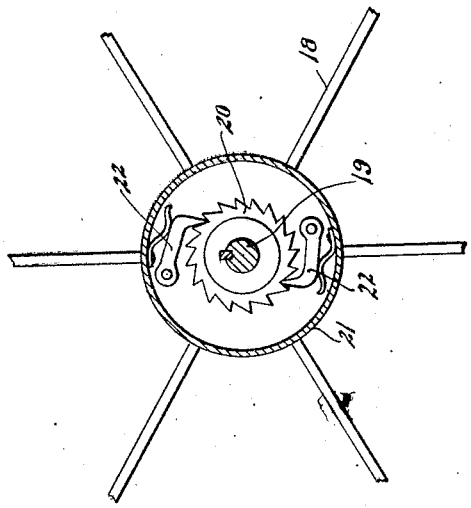
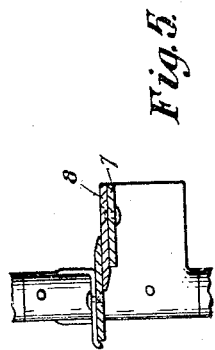
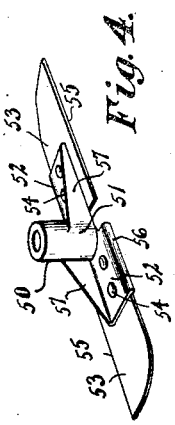
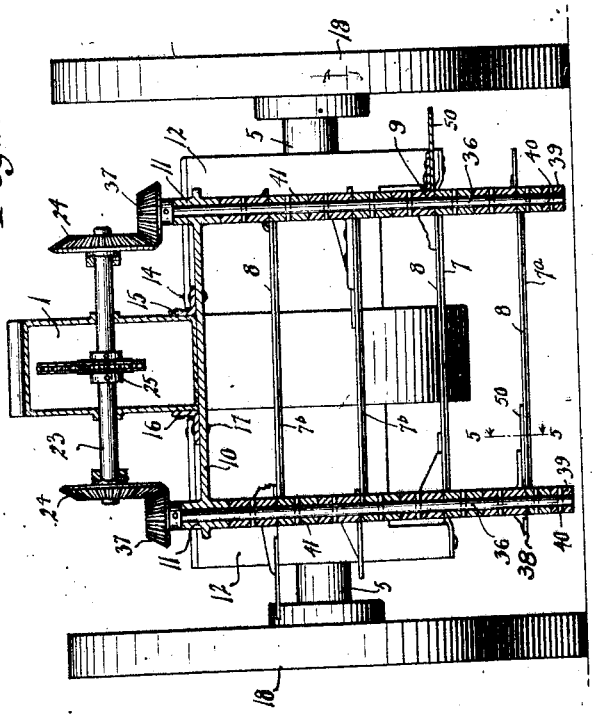
G. Bornemann
F. C. Hoese.
INVENTOR
BY Victor J. Evans
ATTORNEY
WITNESS:

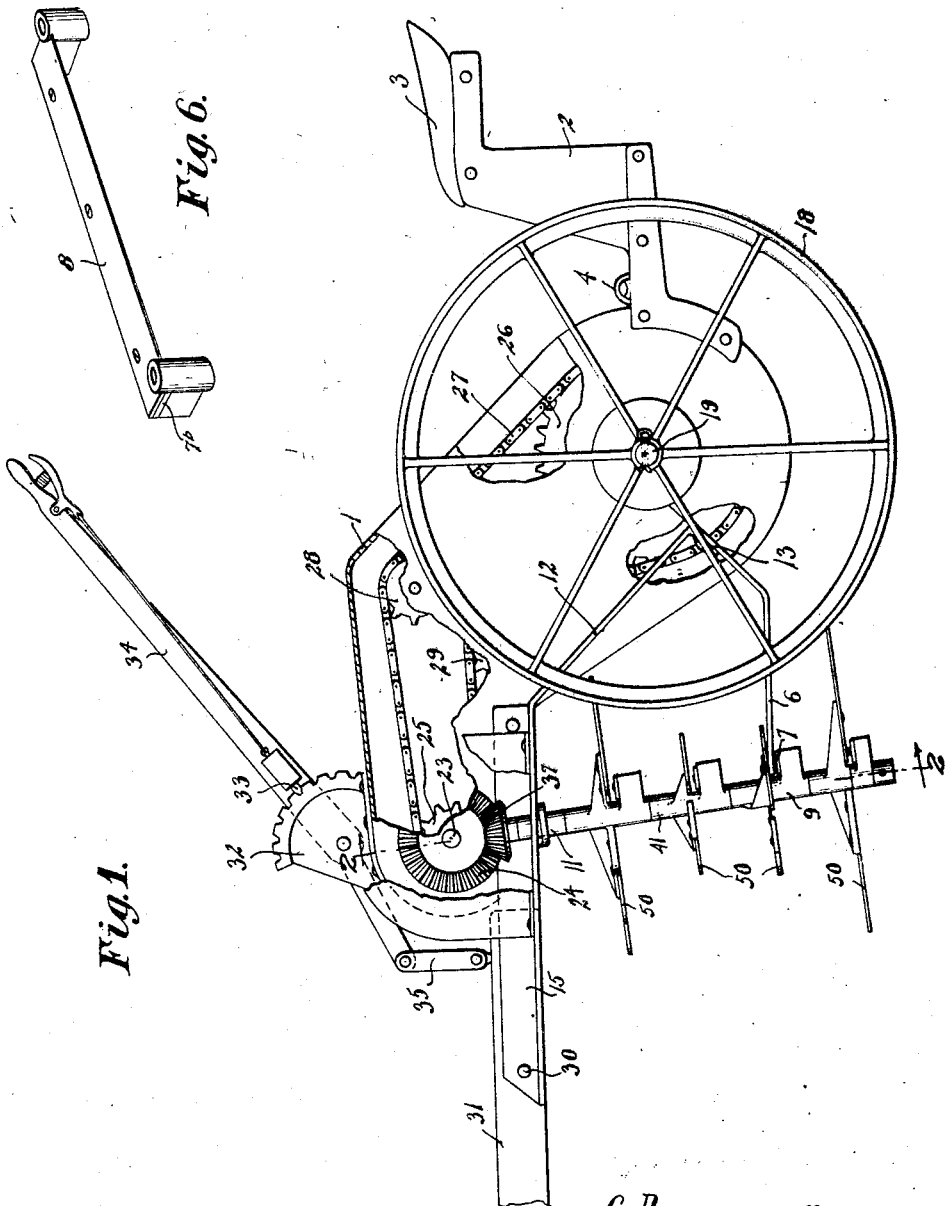

Patented Sept. 28, 1926.

1,601,288

UNITED STATES PATENT OFFICE.

GUS BORNEMANN AND FRED C. HOESE, OF SAN ANTONIO, TEXAS.

STALK-CUTTING APPARATUS.

Application filed April 28, 1924. Serial No. 709,560.

Our present invention pertains to wheeled stalk cutters, and has for one of its objects to provide an efficient machine adapted incident to a traverse of a field to sever the stalks in a row from the ground and at the same time cut the stalks into short lengths so they can be readily turned under by a plow to serve as fertilizer.

Another object of our invention is the provision of a wheeled stalk cutter of advantageous general construction well adapted to serve efficiently the purposes indicated and to withstand the usage to which stalk cutters are ordinarily subjected.

To the attainment of the foregoing, the invention consists in the improvement as hereinafter described and definitely claimed.

In the accompanying drawings, forming part of this specification:—

Figure 1 is a side elevation of the apparatus constituting the preferred embodiment of our invention, with portions of the casing body broken away.

Figure 2 is a detail vertical, cross-section taken in the plane indicated by the line 2—2 of Figure 1 with some parts in elevation.

Figure 3 is a detail vertical section showing the preferred manner of transmitting rotary motion from the ground wheels to the axle shaft.

Figure 4 is a perspective showing one of the rotary heads and the knife blades carried thereby.

Figure 5 is a detail longitudinal section showing the manner in which the rotary blades cross the transverse fixed blades.

Figure 6 is a front elevation showing one of the transverse fixed blades, the bar by which it is carried and the vertical spacing sleeves at the ends of said bar.

Similar numerals of reference designate corresponding parts in all of the views of the drawings.

Among other elements our novel stalk cutter comprises a casing body 1, shaped as illustrated, and provided at its rear end with an upright 2 on which is an operator's seat 3. A transverse foot rest 4 is fixed on and extends laterally from the base of the upright or support 2 as illustrated.

At 5 the casing body 1 is provided with fixed lateral sleeves to which are fixed forwardly extending bars 6. These bars 6 are connected at their forward ends to the ends of a transverse bar 7 which carries one of the stationary transverse blades 8 and is fixedly connected adjacent to its ends to upright spacing sleeves 9.

Appropriately fixed to the underside of the forward portion of the casing body 1 is a transverse frame bar 10 with vertically disposed spacing sleeves 11 at its ends.

Arranged at opposite sides of the casing body 1 are fenders 12. These fenders 12 are fixedly connected at 13 to the bars 6 and are also superimposed upon and fixed at 14 to angle bars 15 fixed to opposite sides of the casing body 1 as designated by 16. It will also be noticed by reference to Figure 2 that the angle bars 15 are superimposed upon and are connected at 17 to the transverse frame bar 10.

The ground wheels of the apparatus are designated by 18 and are loosely mounted on an axle shaft 19, which extends through and is rotatable in the casing body 1 and the lateral sleeves 5 thereof. In the present and preferred embodiment of my invention ratchet disks 20 are fixed to the axle shaft 19 and are arranged in housings 21 carried by the wheels 18 and the wheels 18 are provided in the housings or hubs 21 with spring pressed pawls 22 designed for cooperation with the said disks 20 in the ordinary well known manner and for the usual purpose. The ground wheel shown in Figure 3 is the right hand ground wheel, and it will be readily understood that forward rotation of the said ground wheel will be attended by rotation of the axle shaft 19, and this without interfering with rotation of the axle shaft 19 forwardly while the wheel 18 is at rest.

Journaled in the upper forward portion of the casing body 1 is a transverse shaft 23 with miter gears 24 at its ends and a sprocket gear 25 at its center and within the casing body 1. It will also be understood that a sprocket gear 26 is fixed to the axle shaft 19, and that a sprocket belt 27 is mounted on the sprocket gears 25 and 26 so as to transmit motion from the latter to the former, the stretches of the said belt 27 being passed over idler sprocket gears 28 and 29 as shown in Figure 1. We would also have it understood that the gear 26 is larger than the gear 25 in about the proportion illustrated so that the shaft 23 will be caused to turn at a much higher rate of speed with the axle shaft 19.

The angle bars 15 are extended forwardly of the casing body 1 as best shown in Figure 1, and pivoted between the angle bars 15 at the point 30 is a tongue 31 for the hitching of draft animals or for the connection of the stalk cutter to a tractor.

On its upper forward portion the casing body 1 is provided with a segmental rack 32 for cooperation with a detent 33 of a hand lever 34, the said lever 34 being connected by a link 35 with the rear arm of the tongue 31, so that the cutting apparatus hereinafter described may be raised and lowered and may be adjustably fixed at various heights relative to the ground.

Journaled in the upright sleeve 9 of the bar 7 and also in the upright sleeves 11 of the frame bar 10 are upright shafts 36, these shafts having fixed on their upper ends miter gears 37 meshed with the before mentioned miter gears 24. Arranged below the bar 7 is a bar 7ª on which is fixed a stationary cutting blade 8, and it will also be understood that upright sleeves 38 are fixed to the said bar 7ª and are arranged on the shafts 36 and above supporting collars 39, fixed at 40 to the shafts.

Between the frame bar 10 and the bar 7 are arranged transverse bars 7ᵇ, spaced apart and each carrying a stationary transverse blade 8. At their ends the bars 7ᵇ are fixed with respect to sleeves 41 in which the shafts 36 are journaled.

Fixed to and rotatable with the shafts 36 and arranged above the bars 7ª, 7, and 7ᵇ are rotary cutters 50 one of which is shown in Figure 4. By reference to said figure it will be noticed that each rotary cutter comprises a head 51 having oppositely disposed arms 52, and blades 53 fixed at 54 to the arms 52 and provided with cutting edges 55. It will also be noticed that each arm 52 has a heel portion 56 back of its respective blade 53 and bearing against the rear edge of the said blade so as to take strain off the rivets or other connections 54, and that each arm 52 is provided with an upstanding flnage 57 which assists in strengthening the connection of the blades 55 to the sleeve-like head 51. It will also be understood that the flanges 57 operate to move stalk portions rearwardly over the stationary cutting blades and in that way contribute to the efficiency of the apparatus.

In the practical operation of our novel stalk cutter it will be manifest that the rotary cutters on one shaft 36 will be rotated in one direction, and the rotary cutters on the other shaft 36 will be rotated in the opposite direction, and that when the apparatus is moved along a row of stalks, the stalks will be severed from the ground and at the same time will be divided into short lengths as is desirable.

We have entered into a detailed description of the construction and relative arrangement of the parts embraced in the present and preferred embodiment of our invention in order to impart a full, clear and exact understanding of the said embodiment. We do not desire, however, to be understood as confining ourselves to the specific construction and relative arrangement of parts inasmuch as in the future practice of the invention various changes and modifications may be made such as fall within the scope of our invention as defined in our appended claim.

Having described our invention, what we claim and desire to secure by Letters-Patent, is:—

A stalk cutter comprising a traction axle, a ground wheel at each end thereof, a casing body mounted on the axle, a transverse frame bar on the casing body, up-right sleeves fixed to the ends of said bar, longitudinal bars connected to said casing body, a transverse bar connected to the outer ends of said longitudinal bars, a transverse shaft in the casing body and having miter gears thereon, a driving connection within the casing body between said transverse shaft and the traction axle, up-right shafts in said up-right sleeves and having miter gears meshed with the first named miter gears, a stationary knife blade carried by the second named transverse bars, intermediate stationary transverse bars having up-right sleeves receiving the up-right shafts, knife blades on each of said intermediate stationary transverse bars and rotary cutters fixed on the up-right shafts and having blades movable past the stationary blades.

In testimony whereof, we affix our signatures.

GUS BORNEMANN.
FRED C. HOESE.